No. 693,968.  
C. W. HINCHCLIFFE.  
ROUNDABOUT.  
(Application filed June 26, 1901.)

Patented Feb. 25, 1902.

(No Model.)

2 Sheets—Sheet 1.

Witnesses:  
Thomas P. Drummond  
Adolph F. Kaiser

Inventor:  
Charles W. Hinchcliffe,  
by Crosby & Gregory  
Atty's.

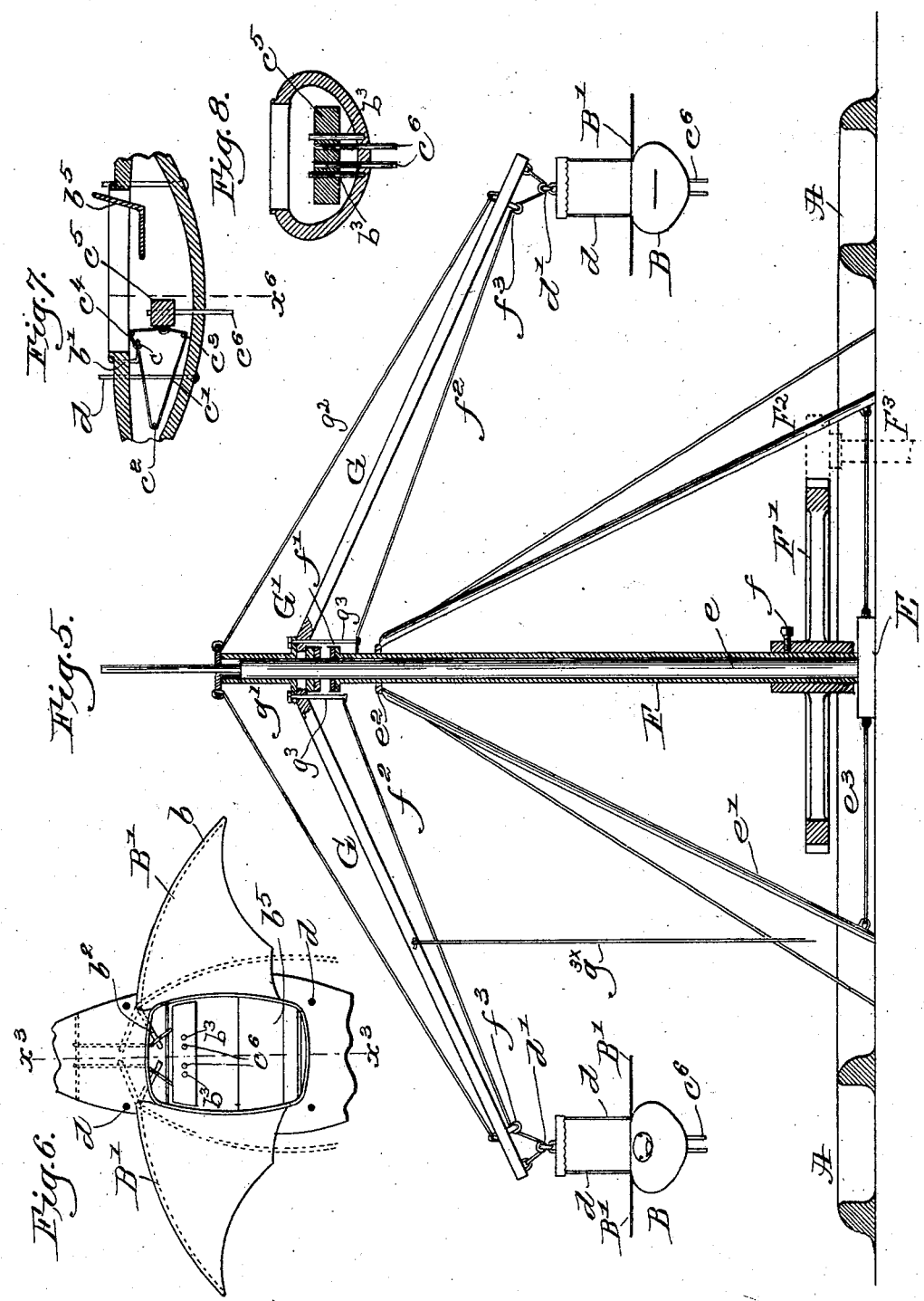

UNITED STATES PATENT OFFICE.

CHARLES W. HINCHCLIFFE, OF LAWRENCE, MASSACHUSETTS.

ROUNDABOUT.

SPECIFICATION forming part of Letters Patent No. 693,968, dated February 25, 1902.

Application filed June 26, 1901. Serial No. 66,140. (No model.)

*To all whom it may concern:*

Be it known that I, CHARLES W. HINCHCLIFFE, a citizen of the United States, residing at Lawrence, in the county of Essex and State of Massachusetts, have invented an Improvement in Roundabouts, of which the following description, in connection with the accompanying drawings, is a specification, like characters on the drawings representing like parts.

This invention has for its object the production of a novel roundabout wherein the passenger-carriers are represented as birds which are made to travel in a circular path in mid-air. The birds are shown as having wings which are spread during their flight and closed when the birds are at rest.

Figure 1:
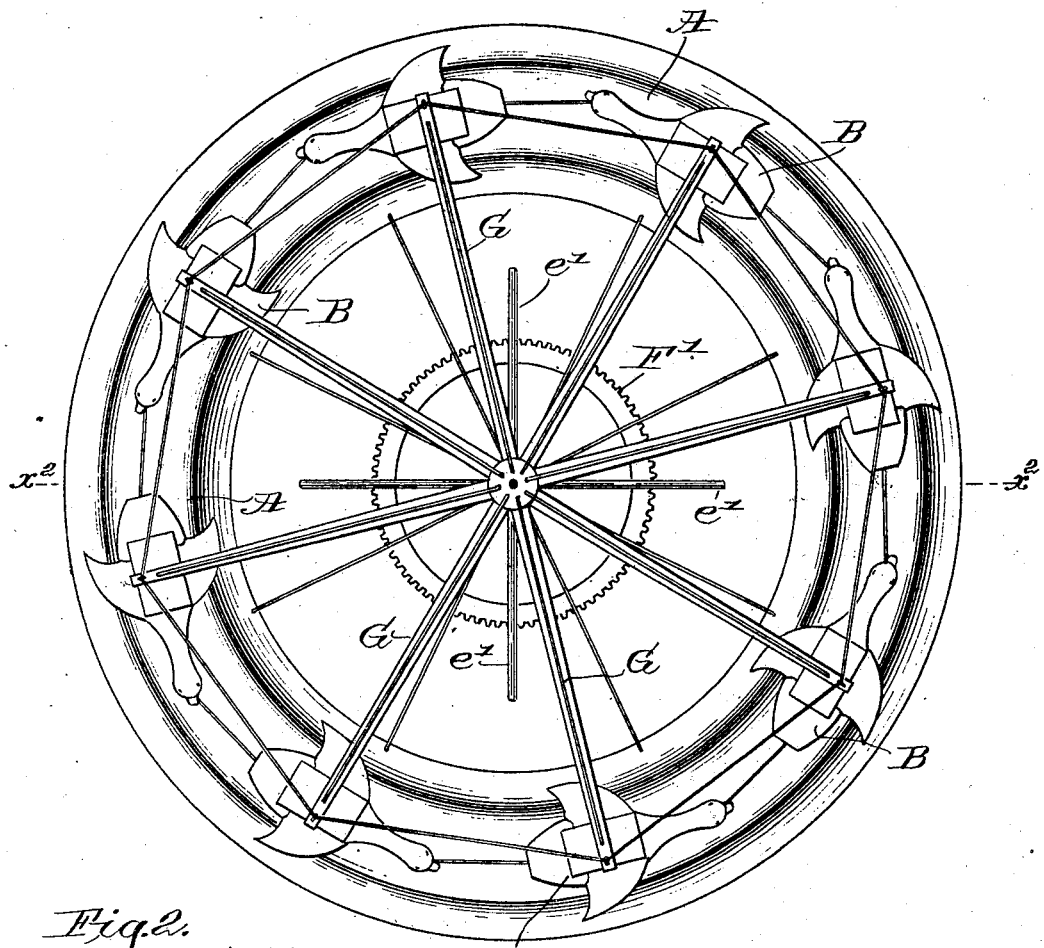
Figure 2:
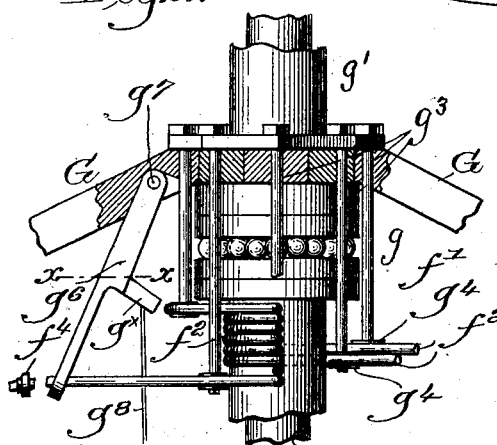
Figure 3:
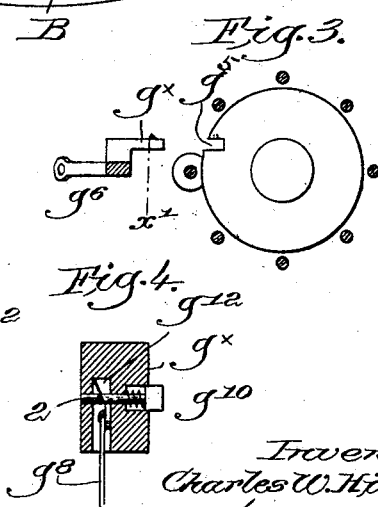

Figure 1 in plan view shows a roundabout embodying my invention, the passenger-carriers or birds being supposed to be in motion. Fig. 2 is an enlarged detail showing the hub to which are attached the bird-carriers. Fig. 3 is a section below the dotted line $x$, Fig. 2. Fig. 4 is a section, much enlarged, in the line $x'$, Fig. 3. Fig. 5 is a section in the line $x^2$, Fig. 1. Fig. 6, enlarged, shows part of a passenger-carrier shown as a bird with the wings spread, the dotted lines showing the wings folded to the body. Fig. 7 is a sectional detail in the line $x^3$, Fig. 6, showing part of the wing-actuating mechanism; and Fig. 8 is a section in the line $x^6$, Fig. 7.

Referring to the drawings, A represents, it may be, a nest sustained on the ground or floor and of suitable shape to receive and sustain the under side of the body B, which constitutes a passenger-carrier and which for the most pleasing results may be shaped to resemble a bird—as, for instance, wild ducks, as I have chosen for sake of illustrating my invention; but any other form of bird may be employed instead.

When I shape the carriers to resemble birds, they will have wings B', of any suitable material, connected with a suitable forearm $b$, which may be of wire bent at its end next said body, as best shown in Fig. 7 at $b'$, and then bent inwardly, as at $b^2$. The ends $b^2$ enter, as shown, suitable rings or eyes $c$, Fig. 7, to which are connected the opposite ends of suitable cables or cords $c'$, said cords being herein shown as extended over suitable guide-rods $c^2$ $c^3$ $c^4$, the cords being also connected with a bar $c^5$, free to move vertically on suitable guide-rods $b^3$. (See Figs. 6 and 8.) The bar, cords, and devices moved by them constitute one simple form of wing-actuating means; but instead I may use any equivalent or suitable wing-actuating means without departing from my invention, as I believe that I am the first to provide for a movement of the wings in an apparatus of the class described. The bar $c^5$ has depending from it suitable legs $c^6$, shown as rods extending through holes in the carrier or body.

When the carrier represented as a bird is at rest, supposedly on its nest, the feet are pushed into the body by contact with the nest, and the cords are moved to sway the forearms $b$ into the dotted-line position, Fig. 6, thus closing the wings, which for the best results may be made of any fabric.

When the carriers or bodies are lifted from the nests to be started into flight in mid-air, as will be described, the weight of the bar $c^5$ causes the legs to protrude and to pull on the cord to spread the wings as in Fig. 1. The carriers will have a suitable seat, as $b^5$, to hold passengers.

The carriers are provided with strong rods $d$, preferably four in number, on the upper ends of which I mount a strong deck of either wood or metal, and I provide the top of this deck with a suitable sheave $d'$.

The central part or foundation E of the roundabout is of suitable material to sustain a stiff staff $e$, and outside this staff I have arranged a series of braces $e'$, connected at their upper ends with an external bearing $e^2$, the lower ends of the braces being connected with the central part E by guy-rods $e^3$.

The central foundation E may contain a series of balls, as will be evident, on which may rest the lower end of a hollow shaft or spindle F, having a toothed wheel F' connected therewith by a suitable set-screw $f$. The wheel F' is in practice engaged by a pinion $F^2$ on a shaft $F^3$, driven by power in any usual or suitable manner, the pinion being adapted to be engaged by a suitable clutch splined to the shaft and adapted to be turned in either direction, as may be required and as commonly practiced in roundabouts. The hollow shaft F is embraced near its upper end by the bearing $e^2$, and the upper end of said shaft is shown as provided with a flange $f'$, a portion of the shaft between said flange and bearing constituting a drum to which the inner ends of a series of ropes $f^2$, equal in number to the carriers, are suitably attached, as shown in Fig. 2. The outer ends of each rope $f^2$ is passed over a sheave $f^3$ under the sheave $d'$ and is then connected with one of the bars G. The bars G are bolted or fixed to the hub of a clutch $G'$, resting, as shown, on a series of balls $g$, sustained above the flange $f'$ of the shaft F. The upper end of the hub $G'$ sustains a bearing $g'$, which sustains a series of guy-rods $g^2$, connected with and to support the arms G. A series of rods $g^3$ of different length depend from the hub $G'$, and said rods carry at their lower ends sheaves $g^4$, (see Fig. 2,) each located substantially at the level of the point of attachment with said drum of one of the ropes $f^2$. The flange $f'$ (see Fig. 3) has a notch $g^5$, which may be engaged, when desired, by a locking device $g^6$, shown as an arm pivoted at $g^7$, to one of the bars G, (see Fig. 2,) said arm having a locking extension $g^\times$, provided with a catch $g^{10}$ and a wedge or device $g^{12}$ and having connected with it a suitable cord $g^8$, by which to withdraw the locking device from the notch of the flange $f'$. The lowermost cord $f^2$ of the series of cords is shown as provided with a projection or knot $f^4$. (See Fig. 2.)

Operation: Assuming that the carriers B are at rest and their bodies sustained in the rests A, the legs $c^6$ will have been pushed in to raise the bar and cause the wings to be closed against the bodies, as shown by dotted lines, Fig. 6. To start the apparatus after the carriers have been loaded, the attendant will first start the hollow shaft F slowly and wind the cords $f^2$ on the said shaft above the bearing $e^2$, thus raising the carriers into the position shown in Fig. 5. Just as the sheaves $d'$ arrive sufficiently near the said bars to prevent any serious movement of the carriers outwardly due to centrifugal motion the knot $f^4$ will meet the locking device and cause it to be moved to enter the notch $f^2$ in the moving flange $f'$, and the catch $g^{10}$, carried by said arm, will engage a suitable notch in the side of the notch $g^3$, and this done the hub $G'$ will be coupled with and be rotated in unison with the hollow shaft F. After the proper number of circuits the attendant will stop the shaft F and then pull the cord $g^8$, slide the extension $g^\times$, and it meeting a stud 2 on the shank of the latch $g^{10}$ will retract the latter and permit the locking device to be disengaged from the notch of the flange $f'$, and then by reversing the direction of the movement of the shaft F, the carriers may be lowered into their rests and the wings will be closed. The cord $g^{3\times}$ may be engaged by the attendant to stop the carriers in their proper positions.

It will be noticed that the central shaft F, employed to rotate the hub, having the arms from which are suspended the passenger-carriers, is braced rigidly in its operating vertical position by or through braces $e'$, located within the orbit or path of movement of the passenger-carrier. This is a most important feature in the construction of my roundabout, as thereby it may be set up and operated in a smaller space than can a roundabout having its central shaft braced outside the orbit of the passenger-carrier, as is now commonly done.

Of course one or a plurality of cables may be used in connection with each passenger-carrier.

This invention is not limited to the particular form of locking device shown, and instead I may employ any usual or suitable equivalent for the same.

Having described my invention, what I claim, and desire to secure by Letters Patent, is—

1. In a roundabout, a series of passenger-carriers, a shaft, a drum, a hub having a series of bars, cables sustained by said bars and connected with said passenger-carriers, means to rotate said shaft and drum to wind said cables and lift the carriers into space, and means to thereafter start said hub with its bars to move said carriers in a circular path.

2. In a roundabout, a series of passenger-carriers, a shaft, a drum, a hub having a series of bars, cables connecting said bars with said passenger-carriers, means to rotate said shaft and drum to wind said cables and lift the carriers into space, and means to couple said hub with said shaft that it and the bars may be rotated in unison with said shaft to move the carriers in a circular path.

3. In a roundabout, a series of passenger-carriers, a shaft, a drum, a hub having a series of bars, cables connected with said bars and passenger-carriers, means to rotate said shaft and drum to wind said cables and lift the carriers into space, and a locking device operated automatically by one of said cables to couple said hub with said shaft when the passenger-carriers have been elevated to the desired distance, said locking device insuring the rotation of the hub and its arms with said shaft.

4. In a roundabout, a series of passenger-carriers, a hub having a series of bars, cables sustained by said bars and connected with said carriers, a drum, and means to rotate it to wind said cables to lift the carriers that they may be rotated freely in space.

5. In a roundabout, a series of passenger-carriers, a hub having a series of bars, cables sustained by said bars and connected with said carriers, a drum, and means to rotate it to wind said cables to lift the carriers that they may be rotated freely in space, and a rest to receive said carriers and sustain them firmly when passengers are to get in and out.

6. In a roundabout, a passenger-carrier made as a bird having wings, a series of rigid bars, flexible connections between said carriers and the ends of said bars by which the carriers are supported and individually raised, and means to cause said bars to travel in a circular path.

7. In a roundabout, a passenger-carrier having wings, and means to spread said wings and retain them spread while the carriers are in motion and close said carriers when the carriers are permitted to descend to a position of rest.

8. In a roundabout, a passenger-carrier having wings, a weight, and connections between said weight and wings to open said wings as the carrier is lifted into space.

9. In a roundabout, a passenger-carrier composed of a body having a space for passengers and wings at opposite sides said space, and means connected with said wings to close the same on the sides of said body and at the sides of said space to thereby enable passengers to enter the space of said carriers as the latter come to rest.

10. In a roundabout, a passenger-carrier made as a bird having pivoted wings, rods projecting downwardly from said carrier when in motion, and means actuated by said rods to close said wings when the said carrier comes to rest.

11. In a roundabout, a series of passenger-carriers having a series of rods, a series of rigid bars, cables carried by said bars, sheaves connected with said carriers and embraced by said cables, and means to wind said cables to lift said carriers into proper position before starting the bars and the carriers, to move the latter in a circular path.

12. In a roundabout, a stationary part, a passenger-carrier composed of a body having a space for passengers and wings at opposite sides of said space, a guided weight having depending rods which, as the carriers come into position of rest meet the stationary part and close said wings upon the bodies of said carriers.

In testimony whereof I have signed my name to this specification in the presence of two subscribing witnesses.

CHARLES W. HINCHCLIFFE.

Witnesses:
FRANCES J. CRAIG,
ALFRED J. HINCHCLIFFE.